May 10, 1960   R. C. STEELE ET AL   2,936,021
HONEYCOMB EXPANDING MEANS AND METHOD
Filed May 29, 1956   3 Sheets-Sheet 2
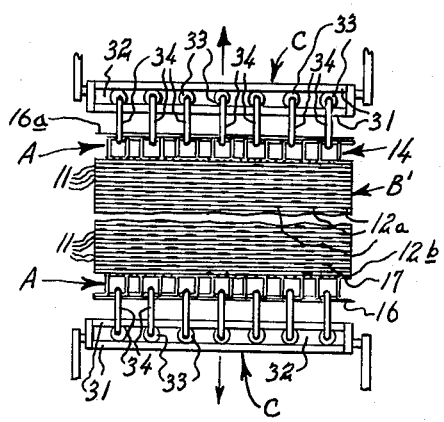
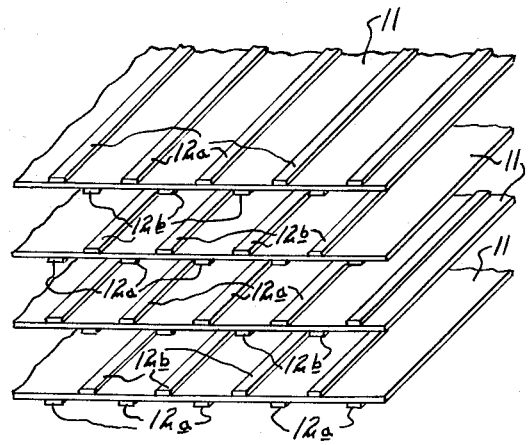
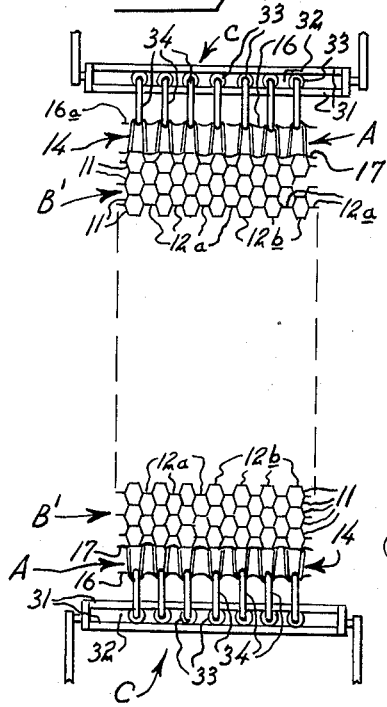
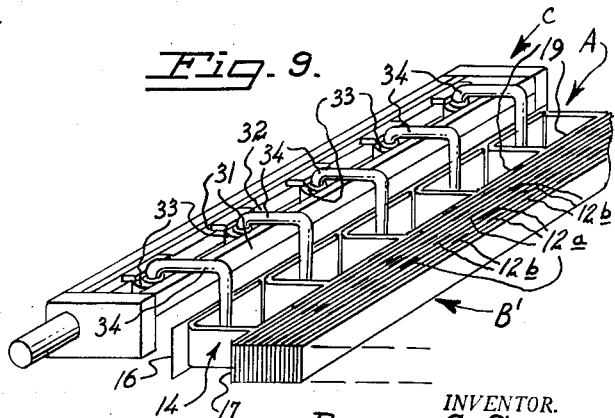
INVENTOR.
ROGER C. STEELE
BY WILLIAM W. SWAIN
Townsend and Townsend
ATTORNEYS

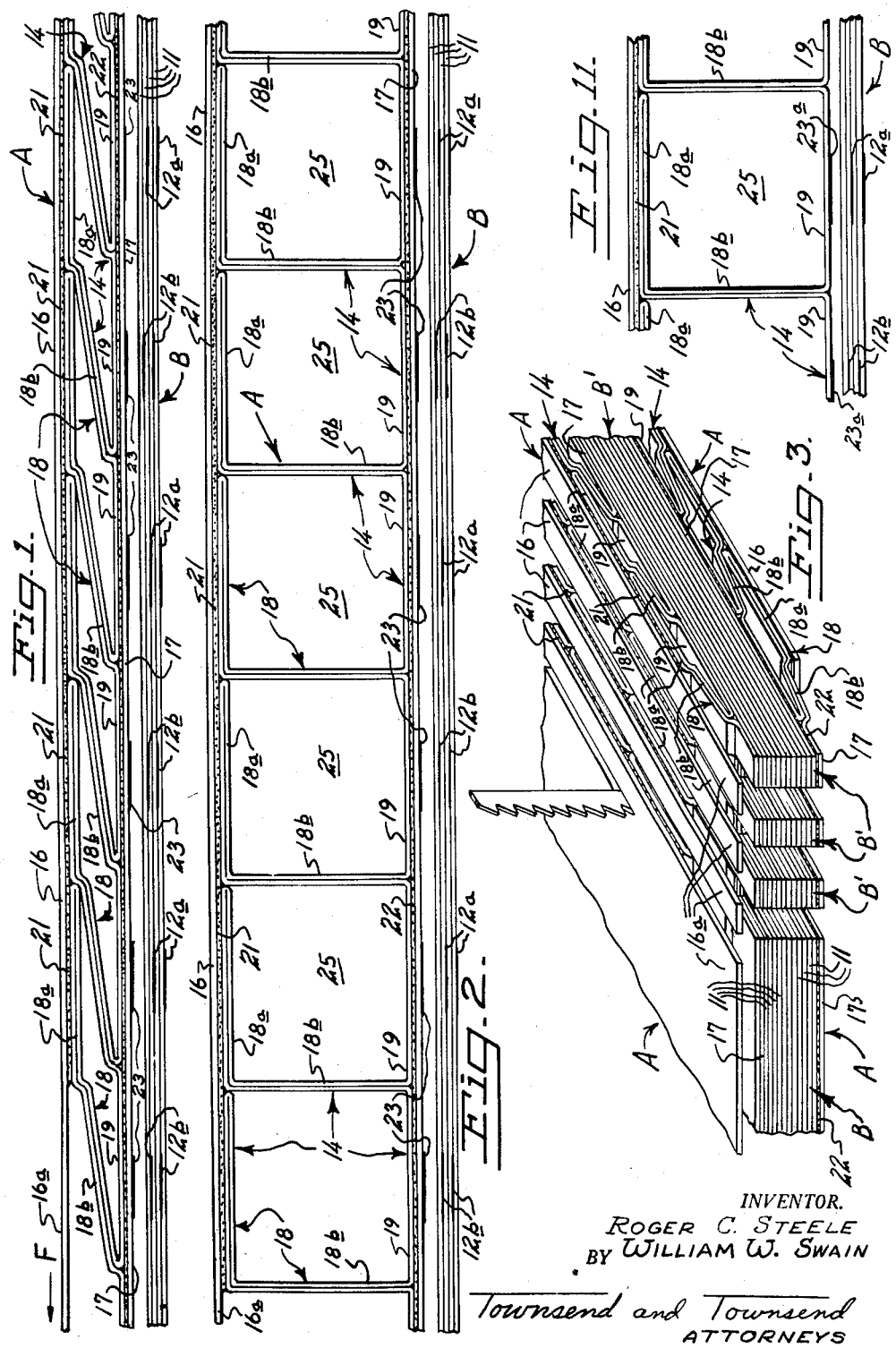

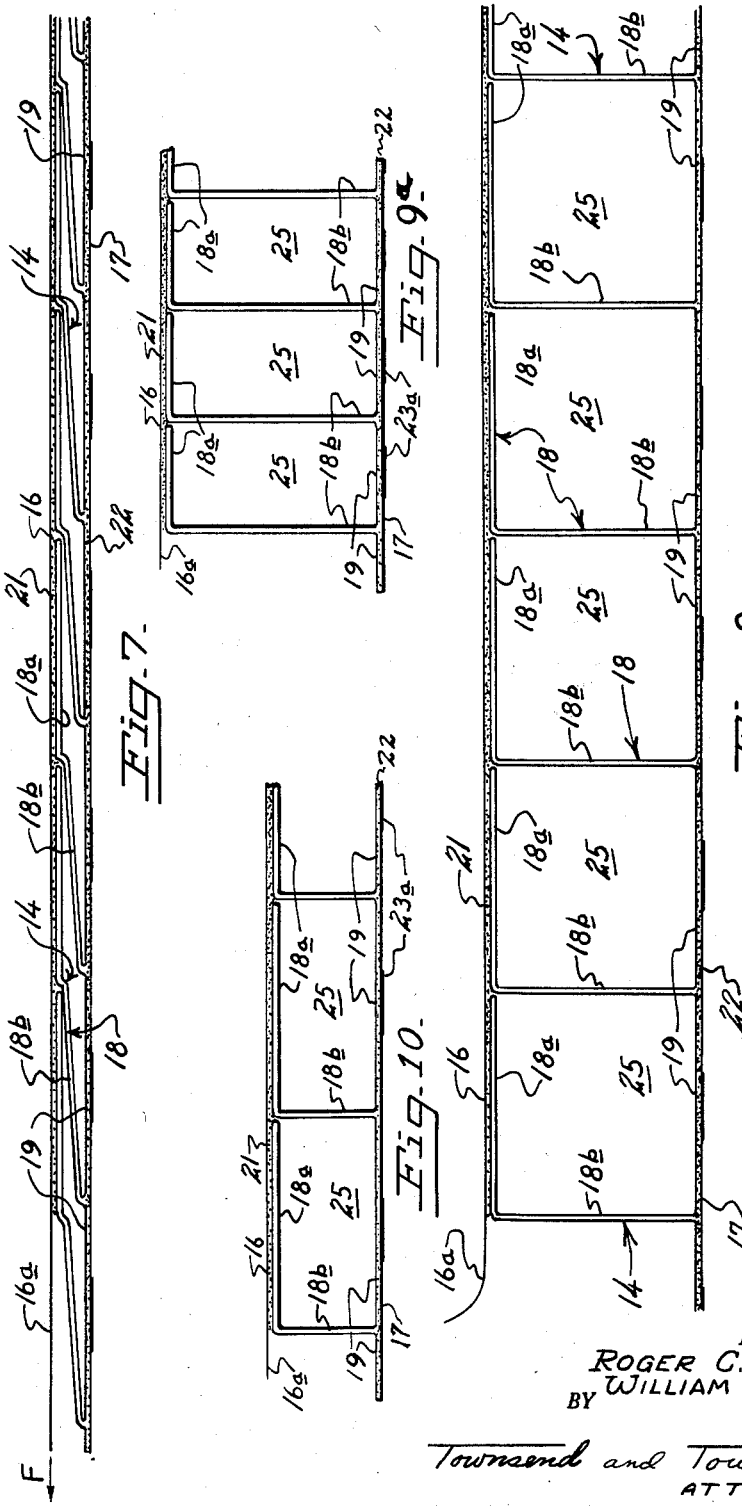

United States Patent Office 2,936,021
Patented May 10, 1960

2,936,021

HONEYCOMB EXPANDING MEANS AND METHOD

Roger C. Steele and William W. Swain, Oakland, Calif., assignors to Hexcel Products Inc., Oakland, Calif., a corporation of California Application May 29, 1956, Serial No. 588,051

6 Claims. (Cl. 154—1)

This invention relates to new and improved honeycomb expanding means for transmitting substantially uniform expansion forces to the end webs of unexpanded sections of honeycomb or similar expansible type cellular material, and to a method of manufacturing honeycomb sections with tug-pin assemblies attached to opposite end webs thereof.

In the commercial manufacture of honeycomb, especially metal foil honeycomb (made of aluminum foil or stainless steel sheet material) by the expansion process, there are, perhaps, two ways most frequently utilized to expand the compacted honeycomb material to its open cell expanded condition. One commercial way of expanding the material is through use of apparatus of the specific character and kind disclosed in United States Patent No. 2,674,295. The expanding equipment therein disclosed is specifically shown as comprising looped anchoring strips formed of fabric or cloth material, such as canvas, which by means of double coated pressure sensitive tape or other adhesive means are adapted to be adhered to opposite end webs of a block of unexpanded honeycomb. Although quite good results insofar as securing uniformity and evenness of expansion of honeycomb can be obtained in using equipment of the character specifically disclosed in said prior patent, the process and equipment has certain practical and economic limitations in commercial honeycomb manufacture. For example, the specially fabricated looped cloth material is comparatively expensive to use in large volume honeycomb production. Furthermore, substantial labor is required to adhesively secure the looped anchoring strips to opposite end webs of each individual section or block of material.

Another way of expanding honeycomb by commercial fabricators is through use of tug pins inserted through opposite end marginal cells of the unexpanded honeycomb. The pin expanding method is subject to the general disadvantage and criticism that where the pins engage the honeycomb during the expansion process, the honeycomb is subject to deformity or rupture and the marginal end areas engaged by the pins must be trimmed off as waste material. In many instances, this waste loss is not an insignificant economic factor in the overall cost of honeycomb manufacture.

A principal object of the present invention is to provide relatively cheap and simple to use anchoring assemblies made from pleated sheet material that can be adhesively attached to the end webs of an unexpanded honeycomb section, and which are foldable from a flat compacted condition to an open cell or looped condition, and through which said open cells or loops tug pins or the like can be projected for transmitting uniform expansion forces to the unexpanded honeycomb section.

When it is considered that a substantial percentage of unexpanded metal foil honeycomb is shipped from the manufacturer to a fabricator or ultimate consumer in its unexpanded condition for subsequent expansion by the purchaser, it is of economic and practical importance that a way be provided for the latter to expand the material in as convenient and simplified manner as possible and with minimum requirements for skilled labor or expensive equipment. The present invention embraces the concept and object of a manufacturer being able to fabricate and apply the anchoring assemblies to the unexpanded sections or blocks of honeycomb as an integral part thereof at the time they are manufactured whereby when such a block or section is shipped to a consumer or fabricator, the latter may very simply and easily utilize the self-contained expansion means in expanding the material at whatever site or location it is most convenient for him to do so. Anchoring means embodying the present invention are inherently adapted to be manufactured and applied to the unexpanded honeycomb sections in a flat folded or compacted condition permitting convenient and economical storage and shipment of the sections. When such a section or block of honeycomb is in readiness for expansion, the compacted pleated material may be rapidly and easily unfolded to its open position of use by pull tab means to be hereinafter described in more detail.

Another feature of the anchoring assemblies is that they may be manufactured in relatively large flat sections coextensive in area to the end webs of relatively large unexpanded blocks of honeycomb. This permits the assemblies to be first applied to the opposite end webs of the block which can then be sawed into slices of desired or specified thickness in which case the end web portions of the individual slices are left provided with an assembly component of appropriate width and length corresponding to the dimensions of the slice.

Another important economic advantage of the invention is that the anchoring assemblies may be formed of relatively inexpensive flat sheet material such as, for example, aluminum foil material.

Other numerous objects and advantages of the invention will become apparent upon reading the following specification and referring to the accompanying drawings in which similar characters of reference represent corresponding parts in each of the several views.

In the drawings:

Fig. 1 is an enlarged fragmentary plan view of an unexpanded honeycomb block or section showing an anchoring assembly embodying the invention in partially compacted condition and shown in exploded relationship to the end web of said honeycomb block.

Fig. 2 is an enlarged fragmentary plan view of an unexpanded honeycomb block or section showing an anchoring assembly in its open or expanded condition of use.

Fig. 3 is a fragmentary perspective view of a relatively large unexpanded parent block of honeycomb showing how anchoring assemblies constructed according to the invention may be adhesively applied to opposite end web surfaces of said block, and how said block with the assemblies attached can be sawed into individual honeycomb sections or slices of desired thickness.

Fig. 4 is a fragmentary perspective view of a stack of unexpanded honeycomb showing the sheets in exploded relationship.

Fig. 5 is a top plan view in reduced scale showing schematically an unexpanded honeycomb section with anchoring assemblies secured to opposite end webs thereof and engaged by tug pin assemblies preparatory to expansion of the honeycomb.

Fig. 6 is the same as Fig. 5 showing the relationship of the component parts after expansion of the honeycomb.

Fig. 7 is an enlarged fragmentary top plan view of an anchoring assembly in substantially compacted condition and with the pleated sheet material shown more nearly in true porportion by single line thicknesses.

Fig. 8 is the same as Fig. 7 showing the anchoring assembly in fully open or expanded condition.

Fig. 9 is a perspective view of a suitable tug pin assembly shown in connection with a section of honeycomb and attached anchoring assembly.

Fig. 9a is a plan view in single line thickness of a first modified form of pleated anchoring strip assembly.

Fig. 10 is a plan view in single line thickness of a second modified form of pleated anchoring strip assembly.

Fig. 11 is a fragmentary view of a modified type of anchoring assembly shown in exploded relation to a block of unexpanded honeycomb.

Referring now more specifically to the drawings, anchoring assemblies embodying the invention, as indicated generally at A, are shown attached to the end webs of the honeycomb section indicated generally at B.

There are a number of commercially known and practiced ways of manufacturing honeycomb by the so-called expansion process. One such method is illustrated in U.S. Patent No. 2,734,843 which produces an unexpanded pack or block of honeycomb comprising a plurality of sheets or webs 11 of material stacked and adhered one to the other with opposite faces of each sheet bonded to an adjacent sheet by alternately staggered lines of adhesive such as indicated at 12a—12b in the drawings. The parent honeycomb block A may be sliced or sawed transversely of the glue lines into smaller individually expandable sections of honeycomb B' such as shown in Fig. 3.

Honeycomb is characterized by the tendency of its individual webs to purse inwardly laterally and result in a general narrowing in the direction of its expanded width as the material is expanded in the direction of its length. Accordingly, in order to secure uniformity of cell expansion, it is necessary that the anchoring assemblies which are attached to the end webs of honeycomb be so constructed as to purse or otherwise narrow or contract correspondingly to the narrowing of the honeycomb block during expansion thereof. Hence, it is both desirable and important that the sheet material from which the present anchoring assemblies are manufactured be sufficiently flexible or pursable to permit the looped ends to move relatively toward one another during the expansion process. Although there are various types of sheet material from which the present anchoring assemblies can be manufactured and which would satisfy the requirement of pursability as above mentioned, it has been found that units made of relatively light gauge aluminum foil sheet material are very satisfactory in most applications. In this connection, the invention has been found to have particular utility in connection with the expansion of aluminum foil honeycomb, although the invention is not necessarily restricted to this specific application. Where, however, the material to be expanded comprises aluminum or other metal foil honeycomb, it is practical to make the anchoring assemblies from generally the same gauge or somewhat lighter gauge material as the web material from which the honeycomb itself is manufactured.

Referring in particular to Figs. 1 and 2 and 7 and 8 of the drawings, each of the anchoring assemblies A is shown as comprising a pleated section of sheet material, indicated generally at 14, interposed between and adhesively bonded to first and second anchoring sheets indicated at 16 and 17, respectively. Section 14 may comprise, for example, a sheet or strip of relatively light gauge aluminum foil, such as .002 gauge sheet aluminum, pleated throughout its length in the manner indicated to define a plurality of equidistantly spaced double-folds 18 connected together at their adjoining bases by webs 19 of single thickness material.

In the embodiment shown, the length of each double-fold 18 is approximately twice the length of each single thickness connecting web 19. Approximately the outer one-half length 18a of each fold 18 is adhesively bonded as at 21 to the anchoring strip or sheet 16. The outer face of each single thickness connecting web 19 is likewise adhesively bonded as at 22 to the other anchoring strip or sheet 17.

As shown in the drawings, each anchoring assembly is constructed to be folded to a flat compacted condition, such as generally demonstrated in Figs. 1 and 7. More specifically, in compacted condition each fold 18 completely overlaps an adjacent connecting web 19 and overlaps about one-half the length of an adjacent double-fold of material 18. Each assembly may also be expanded to an open condition, as shown in Figs. 2 and 8, whereby the pleated section 14 and anchoring sheets 16 and 17 define a plurality of open rectangular cells or loops 25. In expanded condition it is noted that the anchoring sheets 16 and 17, together with the portions of the pleated section 14 respectively bonded as at 21 and 22 to said anchoring sections, are spaced apart in parallel relation. The unbonded portions 18b of the folds 18 define the transverse spaced parallel legs or walls of the open cellular structure, and which said legs extend perpendicular to the anchoring sheets 16 and 17.

It is pointed out that Figs. 1 and 2 of the drawings, in disclosing in double lines the sheet material from which the anchoring assemblies are fabricated, give an exaggerated effect as to the actual relative thickness of the material and which, in reality, more nearly approximate the scale or thickness of the single line schematic drawings shown in Figs. 7 and 8. Moreover, even in Fig. 7 where the sheet material is illustrated only by single line drawings of enlarged scale, the anchoring assembly is not shown in tightly compacted condition as is possible to accomplish in actual practice whereby no substantial air space or clearance between the pleated section 14 and anchoring sheets 16 and 17 would be visible to the naked eye.

In order to unfold an assembly A from its compacted to expanded condition, there is provided pull tab means associated with one of the anchoring strips. More specifically, and as shown in the drawings, the pull tab means may comprise an unattached or unbonded end section 16a of anchoring sheet 16. Thus, for example, it is seen that by gripping tab section or extension 16a of anchoring strip 16 and pulling laterally thereon in the direction of arrow F (which is in the direction opposite to the direction in which the folds 18 overlap one another in shingle-like arrangement), all of the legs 18b of the pleated section 14 will be caused to simultaneously swing about their top and bottom fold lines through substantially 90° to define the expanded structure shown in Figs. 1 and 8.

It is believed apparent that anchoring assemblies of the present character may be prefabricated and applied individually to the end webs of precut sections or slices of honeycomb to be expanded. However, if the honeycomb is initially manufactured in the form of relatively large parent blocks of honeycomb that are adapted to be subsequently sawed or sliced into smaller sections, the entire end web areas of the uncut parent block may be provided with anchoring assemblies in the manner indicated in Fig. 3, for example. More specifically, Fig. 3 shows the anchoring sheet 17 of each assembly A adhered to an associated end web surface of the parent honeycomb block A. Each sheet 17 is preferably adhered to an associated end web surface of the honeycomb by spaced adhesive lines 23 which may extend generally parallel to and be arranged in a corresponding pattern to the honeycomb sheet bonding lines 12a and 12b. After application of the assemblies A to opposite end webs of the parent honeycomb block, the latter may be sawed or otherwise sliced transversely into individual honeycomb sections B' as shown in Fig. 3. Thereafter as each section of honeycomb is readied for expansion, the anchoring assemblies may be opened to their open or expanded condition of use as above described.

Figs. 5 and 6 illustrate more or less schematically how an unexpanded section of honeycomb (Fig. 5) to which anchoring assemblies A have been attached in the manner above described can be expanded to its fully opened position (Fig. 6) through use of the anchoring assemblies A in conjunction with suitable tug pin mechanisms, indicated generally at C. As illustrated in Fig. 9, each assembly C may comprise an elongate rigid frame component 31 defining a slotted guideway 32 in which is slidably mounted a plurality of roller bearings 33. Each bearing 33, in turn, individually supports an L-shaped tug pin 34, and the assembly of parts is such that the bearing supported tug pins 34 can move relatively toward and away from one another. In this regard, honeycomb is characterized by its tendency to pursably narrow in the direction of its width as it is expanded in the direction of its length. Hence, it is important that the tug pins which engage the loops 25 of the anchoring assemblies can move closer together corresponding to the amount of widthwise contraction or narrowing of the honeycomb in the expansion process. Thus, for example, it will be observed that the spacing between the tug pins 34 as shown in Fig. 6 (after the honeycomb material has expanded) is less than the spacing between the tug pins shown in Fig. 5 (prior to commencement of the expansion process). Fig. 6 further illustrates how the two anchoring strips 16 and 17 of each looped anchoring assembly A will pursably contract corresponding to the contraction or narrowing of the honeycomb during the expansion process. It is appreciated that to cause expansion of the honeycomb after the tug pins have been releasably engaged within the loops 25 of the anchoring assemblies, it is only necessary to apply opposite expansion or pulling forces in the direction of the arrows indicated in Fig. 5 to cause the tug pin assemblies to move away from one another. The particular construction of the tug pin assemblies C and the particular means by which the tug pin assemblies may be forcibly moved away from one another to cause expansion of the honeycomb do not per se comprise a part of the invention, as there are numerous types of means which might be satisfactorily employed by those skilled in the art. Accordingly, the illustration of the tug pin assemblies C in the drawings is intended to provide merely an example as to how the anchoring assemblies A can be adapted to function in conjunction with suitable tug pin expanding mechanisms.

After a honeycomb section B' has been fully expanded and disengaged from the tug pin assemblies C, the anchoring assemblies A may be stripped or trimmed off opposite end webs of the honeycomb section to which they are bonded, and discarded. As earlier mentioned, it is an object of the invention to minimize waste of honeycomb material—particularly as otherwise often results from the necessity of having to excessively trim off as waste distorted end-cell areas of honeycomb after expansion thereof by more conventional techniques which require that the tug pins be inserted directly into the end-cells of the honeycomb material itself.

Although the specific type of anchoring assemblies indicated at A in the drawings and hereinabove described have been found to be very satisfactory from a practical and commercial standpoint, it is appreciated that the construction of the assemblies A is subject to various changes and modifications within the spirit of the invention. Thus, for example, and referring to Fig. 11, it is entirely feasible to manufacture each assembly A in the manner previously described except that the base anchoring sheet 17 and layer of adhesive 22 may be eliminated altogether. If this is done, the outside surfaces of single thickness webs 19 may be directly adhesively attached to the end web of a honeycomb block or pack to be expanded. The adhesive attachment may be made either by a continuous film of adhesive applied throughout the undersurfaces of connecting webs 19 (similar to previously designated continuous adhesive film 22) or the anchoring assemblies may be attached to the end web of the block by spaced parallel lines of adhesive such as indicated at 23ᵃ in Fig. 11.

Figs. 9 and 10 in the drawings show further structural modifications of the anchoring assemblies. In particular, Figs. 9 and 10 indicate that the pleated section 14 of each assembly may be constructed to define cell openings of any desired rectangular size or shape. In the previous described embodiments of the invention, it is noted that the cell openings 25 are shown as being substantially square after the pleated section is expanded or opened out. The square shape of the cell openings is obtained by making the respective portions 19, and 18ᵃ and 18ᵇ of the pleated section 14 of equal length. In Fig. 9 the assembly A is constructed so that section 18ᵇ is made approximately twice the length of either sections 18ᵃ or 19. This arrangement of elements defines outwardly extending, relatively narrow rectangular cell openings 25 extending in the direction of expansion or pull. In Fig. 10 each section 18ᵇ is shown to be about one-half the length of each of the sections 18ᵃ and 19.

It is observed from the foregoing that sections 18ᵃ, 18ᵇ and 19 of the pleated sheet of material may be all made of the same length or, alternatively, the length of sections 18ᵇ may be varied relative to the common length of sections 18ᵃ and 19. However, the latter two sections are preferably of equal length to maintain the cell openings rectangular in shape and to permit the pleated section to be easily folded to flat compacted condition or expanded out to open condition as previously described.

Although the present invention has been described in some detail by way of illustration and example for purposes of clarity of understanding, it is understood that various other changes and modifications may be made within the spirit of the invention as limited only by the scope of the claims appended hereto.

We claim:

1. Means through which can be transmitted substantially uniform expansion force to the end web of an unexpanded section of honeycomb comprising: sheet material fabricated to define a series of closed loops defining flat base ends and outer ends; means for affixing the flat base ends of said loops to the end web of an unexpanded section of honeycomb to be expanded; said fabricated sheet material foldable from a first flat compacted position, with the closed outer loop ends overlapping each other in shingle-like arrangement and disposed in a substantially common plane parallel to the flat surfaces of said base ends, to a second position, with all of the closed outer loop ends in outwardly spaced parellel relation to said flat base ends; and means comprising a length of sheet material adhered to the outer ends of said loops to foldably move said loops from their first to second positions.

2. Means through which can be transmitted substantially uniform expansion force to the end web of an unexpanded section of honeycomb comprising: sheet material fabricated to define a series of closed loops defining flat base ends and outer ends; means for affixing the flat base ends of said loops to the end web of an unexpanded section of honeycomb to be expanded; said fabricated sheet material foldable from a first flat compacted position, with the closed outer loop ends overlapping each other in shingle-like arrangement and disposed in a substantially common plane parallel to the flat surfaces of said base ends, to a second position, with all of the closed outer loop ends in outwardly spaced parellel relation to said flat base ends; and means comprising a length of sheet material adhered to the outer ends of said loops to foldably move said loops from their first and second positions; said last named length of sheet material including a pull-tab operable upon exertion of axial pulling force applied thereto in a direction opposite which said outer loop ends overlap one another to simultaneously foldably move said outer loops from their first to second positions.

3. The combination of claim 2 and wherein each loop in its second position is substantially rectangular-shaped in plan.

4. Means through which can be transmitted substantially uniform expansion force to an end web of an unexpanded honeycomb section, comprising: a section of sheet material pleated throughout its length defining a plurality of equidistantly spaced double thickness folds and single thickness web portions connecting adjacent folds at their bases; the length of each fold being substantially longer than the length of each connecting web portion; said pleated section foldable to a flat compacted condition with each fold overlapping in shingle-like arrangement an adjacent connecting web and a portion of the length of an adjacent fold; a first flat anchoring sheet adhesively bonded to the outer faces of the said connecting webs; a second flat anchoring sheet adhesively bonded to the outer portion of each fold not overlapped by an adjacent fold; said pleated section of material foldable to an expanded open rectangular cell condition with said first and second anchoring sheets and the portions of said pleated sections respectively adhesively bonded thereto disposed in spaced parallel relation, and the portions of said folds not adhesively bonded to said anchoring strips bent perpendicular to said anchoring strips and extending transversely therebetween; and means for pursably attaching a first said anchoring sheet to the end web of a honeycomb section to be expanded.

5. The combination of claim 4 and wherein the portion of each double fold which is adhesively bonded to said second sheet is the same length as the length of a connecting web.

6. Means through which can be transmitted substantially uniform expansion force to an end web of an unexpanded honeycomb section, comprising: a section of sheet material pleated throughout its length defining a plurality of equidistantly spaced double thickness folds and single thickness web portions connecting adjacent folds at their bases; the length of each fold being substantially longer than the length of each connecting web portion; said pleated section foldable to a flat compacted condition with each fold overlapping in shingle-like arrangement an adjacent connecting web and a portion of the length of an adjacent fold; a first flat anchoring sheet adhesively bonded to the outer faces of the said connecting webs; a second flat anchoring sheet adhesively bonded to the outer portion of each fold not overlapped by an adjacent fold; said pleated section of material foldable to an expanded open rectangular cell condition with said first and second anchoring strips and the portions of said pleated sections respectively adhesively bonded thereto disposed in spaced parallel relation, and with the portions of said folds not adhesively bonded to said anchoring strips bent perpendicular to said anchoring strips and extending transversely therebetween; and means for pursably attaching a first said anchoring sheet to the end web of a honeycomb section to be expanded; and pull-tab means associated with the second said anchoring sheet operable upon pulling force applied to said tab and said anchoring sheet in a direction opposite which said folds overlap one another to simultaneously foldably move said pleated section from its compacted to expanded condition.

References Cited in the file of this patent

UNITED STATES PATENTS

| | | |
|---|---|---|
| 2,305,853 | Eger et al. | Dec. 22, 1942 |
| 2,397,838 | Chavannes | Apr. 2, 1946 |
| 2,428,979 | May | Oct. 14, 1947 |
| 2,648,371 | Goodwin et al. | Aug. 11, 1953 |
| 2,674,295 | Steele et al. | Apr. 6, 1954 |
| 2,719,807 | Steele et al. | Oct. 4, 1955 |